United States Patent
Chen et al.

(10) Patent No.: US 10,197,732 B2
(45) Date of Patent: Feb. 5, 2019

(54) METHODS FOR FORMING ION-EXCHANGED WAVEGUIDES IN GLASS SUBSTRATES

(71) Applicant: Corning Optical Communications LLC, Hickory, NY (US)

(72) Inventors: Minghan Chen, Horseheads, NY (US); Ming-Jun Li, Horseheads, NY (US); Gaozhu Peng, Horseheads, NY (US)

(73) Assignee: Corning Optical Communications LLC, Hickory, NC (US)

( * ) Notice: Subject to any disclaimer, the term of this patent is extended or adjusted under 35 U.S.C. 154(b) by 37 days.

(21) Appl. No.: 15/248,026

(22) Filed: Aug. 26, 2016

(65) Prior Publication Data

US 2018/0059321 A1 Mar. 1, 2018

(51) Int. Cl.
| | |
|---|---|
| G02B 6/10 | (2006.01) |
| G02B 6/134 | (2006.01) |
| C03C 21/00 | (2006.01) |
| C03C 23/00 | (2006.01) |
| G02B 6/122 | (2006.01) |

(52) U.S. Cl.
CPC .......... *G02B 6/1345* (2013.01); *C03C 21/005* (2013.01); *C03C 23/007* (2013.01); *C03C 23/0025* (2013.01); *G02B 6/122* (2013.01)

(58) Field of Classification Search
CPC .. G02B 6/1345; G02B 6/1347; C03C 21/005; C03C 23/0025; C03C 23/007
USPC .................................................. 385/130–131
See application file for complete search history.

(56) References Cited

U.S. PATENT DOCUMENTS

| | | |
|---|---|---|
| 4,886,538 A | 12/1989 | Mahapatra |
| 5,778,120 A | 7/1998 | Asakura et al. |
| 5,859,943 A | 1/1999 | Asakura et al. |
| 6,002,515 A | 12/1999 | Mizuuchi et al. |
| 6,028,977 A | 2/2000 | Newsome |
| 6,055,342 A | 4/2000 | Yi et al. |
| 6,519,077 B1 | 2/2003 | Mizuuchi et al. |

(Continued)

FOREIGN PATENT DOCUMENTS

| | | |
|---|---|---|
| CN | 1252500 C | 4/2006 |
| CN | 1884167 A | 12/2006 |

(Continued)

OTHER PUBLICATIONS

International Search Report and Written Opinion PCT/US2017048154 dated Oct. 24, 2017.

*Primary Examiner* — Thomas A Hollweg
*Assistant Examiner* — Guy Anderson
(74) *Attorney, Agent, or Firm* — Robert L. Branham

(57) ABSTRACT

Methods of forming ion-exchanged waveguides in glass substrates are disclosed. In one embodiment, a method of forming a waveguide in an ion-exchanged glass substrate having an ion-exchanged layer extending from a surface to a depth of layer of the ion-exchanged glass substrate includes locally heating at least one band at the surface of the ion-exchanged glass substrate to diffuse ions in the ion-exchanged layer within the at least one band. A concentration of ions within the at least one band is less than a concentration of ions outside of the at least one band, and at least one waveguide is defined within the ion-exchanged layer adjacent the at least one band. In some embodiments, the at least one waveguide is embedded within the ion-exchanged glass substrate such that an upper surface of the at least one waveguide is below the surface of the glass substrate by a depth d.

25 Claims, 10 Drawing Sheets

(56) References Cited

U.S. PATENT DOCUMENTS

| | | | |
|---|---|---|---|
| 6,954,564 B2 * | 10/2005 | Bendett | G02B 6/12007 385/131 |
| 7,133,428 B2 | 11/2006 | Kitaoka et al. | |
| 2005/0152657 A1 * | 7/2005 | Suetsugu | C03C 3/11 385/129 |
| 2006/0018589 A1 * | 1/2006 | Takahashi | G02B 6/12 385/14 |
| 2006/0051047 A1 * | 3/2006 | Beall | C03C 10/0045 385/141 |
| 2006/0204197 A1 * | 9/2006 | Miyadera | G02B 6/122 385/129 |
| 2008/0226248 A1 * | 9/2008 | Suetsugu | C03C 21/008 385/132 |
| 2008/0264107 A1 | 10/2008 | Malinovich et al. | |
| 2009/0310906 A1 * | 12/2009 | Miyatake | G02B 6/125 385/14 |
| 2011/0112769 A1 * | 5/2011 | Niederberger | G01N 21/648 702/1 |
| 2013/0209047 A1 * | 8/2013 | Atar | G02B 6/13 385/129 |
| 2015/0044445 A1 * | 2/2015 | Garner | C03C 21/002 428/220 |

FOREIGN PATENT DOCUMENTS

| | | |
|---|---|---|
| CN | 100356216 C | 12/2007 |
| CN | 102590941 A | 7/2012 |
| CN | 102745902 B | 7/2014 |
| CN | 105700075 A | 6/2016 |
| EP | 415382 A2 | 3/1991 |
| EP | 1659430 A1 | 5/2006 |
| EP | 1824794 B1 | 2/2016 |
| JP | 5307125 A | 11/1993 |
| JP | 03005235 B2 | 1/2000 |
| JP | 03086239 B2 | 9/2000 |
| JP | 2002258340 A | 9/2002 |
| JP | 2002268021 A | 9/2002 |
| JP | 2002372640 A | 12/2002 |
| JP | 2003021815 A | 1/2003 |
| JP | 2003315585 A | 11/2003 |
| JP | 2005077943 A | 3/2005 |
| JP | 04156136 B2 | 9/2008 |
| JP | 04159881 B2 | 10/2008 |
| JP | 04644844 B2 | 3/2011 |
| WO | 2006067778 A1 | 6/2006 |

* cited by examiner

METHODS FOR FORMING ION-EXCHANGED WAVEGUIDES IN GLASS SUBSTRATES

BACKGROUND

The present disclosure generally relates to optical waveguides for optical communication and, more particularly, to methods for forming ion-exchanged waveguides in glass substrates using localized heating.

As microprocessor performance continues to increase, electrical interconnects for data flow to and from the processors become a dominant bottleneck for overall system performance. Replacing electronic interconnects with optical interconnects may address this bottleneck problem. Optical interconnects provide higher bandwidth-length, higher density, and potential cost and power savings over electrical interconnects.

Optical waveguides are components that may provide optical interconnects between optical components, such as laser sources and photodetectors. Ion-exchanged waveguides in a glass substrate are one type of optical waveguide. Inclusion of ions, such as silver ions, along a narrow path increases the index of refraction of the glass along the path. Optical signals are guided within the narrow path defining the waveguide. Ion-exchanged waveguides are formed by applying a patterned mask layer to a surface of a glass substrate. In such a process, there are multiple complicated and costly steps required to prepare a mask with a desired pattern on the surface of the glass substrate before the ion-exchange process. Thus, the process of creating ion-exchanged waveguides is time consuming and costly, and therefore undesirable for mass production.

Accordingly, alternative methods of fabricating ion-exchanged waveguides are desired.

SUMMARY

Embodiments of the present disclosure are directed to methods of fabricating ion-exchanged waveguides within glass substrates that do not require the use of a pattern mask. Generally, a glass substrate is subjected to an ion-exchange process to create an ion-exchange layer having a higher index of refraction than regions of the glass substrate outside of the ion-exchange layer. Ion concentration trenches are then created within the ion-exchange layer adjacent the desired locations of the ion-exchanged waveguides. The ion concentration trenches are created by localized heating within bands. The localized heating may be provided by the application of laser beams, for example. The localized heating causes ions (e.g., silver ions) to diffuse from the ion-exchange layer deeper within the glass substrate, which lowers the index of refraction in the ion concentration trenches. Thus, ion-exchange waveguides are formed between ion concentration trenches.

In this regard, in one embodiment, a method of forming a waveguide in an ion-exchanged glass substrate having an ion-exchanged layer extending from a surface to a depth of layer of the ion-exchanged glass substrate includes locally heating at least one band at the surface of the ion-exchanged glass substrate to diffuse ions in the ion-exchanged layer within the at least one band. A concentration of ions within the at least one band is less than a concentration of ions outside of the at least one band, and at least one waveguide is defined within the ion-exchanged layer adjacent the at least one band.

In another embodiment, a method of forming a waveguide in a glass substrate includes exposing the glass substrate to an ion-exchange solution to form an ion-exchange layer extending from a surface of the glass substrate to a depth of layer. The method further includes locally heating at least one band at a surface of the glass substrate to diffuse ions in the ion-exchanged layer within the at least one band, such that a concentration of ions within the at least one band is less than a concentration of ions outside of the at least one band, and at least one waveguide is defined within the ion-exchanged layer adjacent the at least one band.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Embodiments of the present disclosure are directed to methods of fabricating ion-exchanged waveguides within glass substrates that do not require the use of a complicated and expensive pattern mask. Generally, a glass substrate is subjected to an ion-exchange process to create an ion-exchange layer having a higher index of refraction than regions of the glass substrate outside of the ion-exchange layer. Ion concentration trenches are then created within the ion-exchange layer adjacent the desired locations of the ion-exchanged waveguides. The ion concentration trenches are created by localized heating within bands. The localized heating may be provided by the application of laser beams, for example. The localized heating causes ions (e.g., silver ions) to diffuse from the ion-exchange layer deeper within the glass substrate, which lowers the index of refraction in the ion concentration trenches. Thus, ion-exchange waveguides are formed between ion concentration trenches. Various embodiments of methods for fabricating ion-exchanged waveguides within a glass substrate are described in detail below.

Figure 1A:
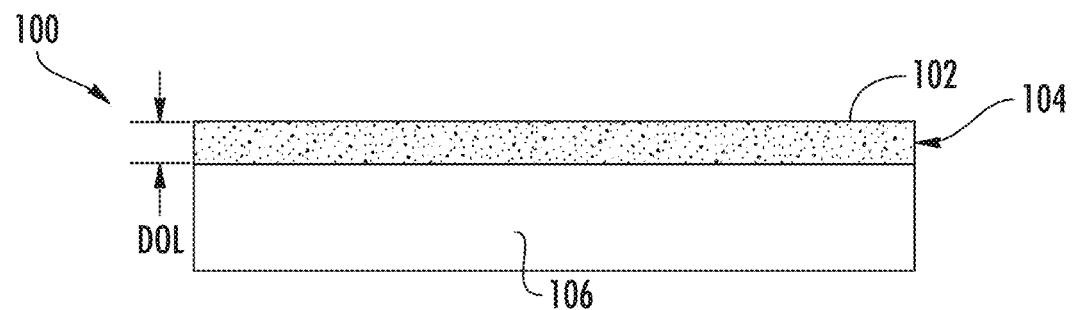
FIG. 1A schematically depicts an example ion-exchanged glass substrate having an ion-exchanged layer according to one or more embodiments described and illustrated herein.

Referring now to FIG. 1A, an example ion-exchanged glass substrate 100 schematically illustrated. The ion-exchanged glass substrate 100 may have any desired thickness depending on the end-use of the ion-exchanged glass substrate 100. As a non-limiting example, the ion-exchanged glass substrate 100 may have a thickness in the range of 50 µm to 4 mm.

Figure 2A:
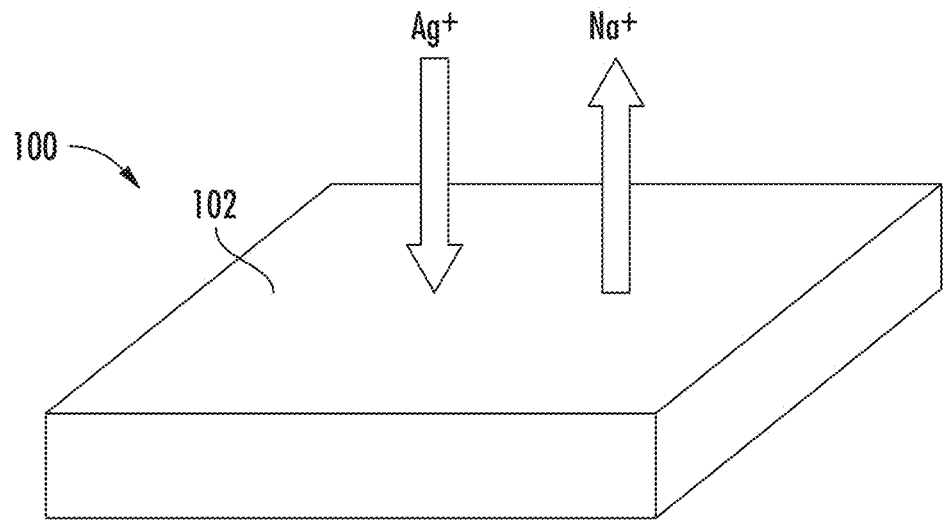
FIG. 2A schematically depicts exchange of sodium ions for silver ions in a glass substrate during an ion-exchange process according to one or more embodiments described and illustrated herein.

The ion-exchanged glass substrate has an ion-exchanged layer 104 extending from a surface 102 to a depth of layer (DOL). The ion-exchanged layer 104 may be formed within the ion-exchanged glass substrate 100 by any known or yet-to-be-developed ion-exchange process. As shown in FIG. 2A, the ion-exchange process forms the ion-exchanged layer 104 by exchanging first ions with second ions present in an ion-exchange solution, such as an ion-exchange bath. Any glass substrate capable of being ion-exchanged may be utilized, for example, borosilicate, phosphate, aluminosilicate, alkali-aluminosilicate glasses. In one non-limiting example, the ion-exchanged glass substrate 100 is an aluminosilicate glass, wherein sodium ions are exchanged with second ions, such as, without limitation, silver, potassium, thallium, cesium, rubidium, and lithium. As an example and not a limitation, the ion-exchange solution may comprise $AgNO_3$. Thus, there is a higher concentration of second ions (e.g., Ag+) within the ion-exchanged layer 104 than outside the ion-exchanged layer (e.g., a bulk 106 of the ion-exchanged glass substrate 100 below the DOL of the ion-exchanged layer 104).

Due to the presence of the second ions, such as silver, the index of refraction is higher in the ion-exchanged layer 104 than in areas outside of the ion-exchanged layer 104. Thus, light propagating within the ion-exchanged layer 104 will remain therein.

Figure 1B:
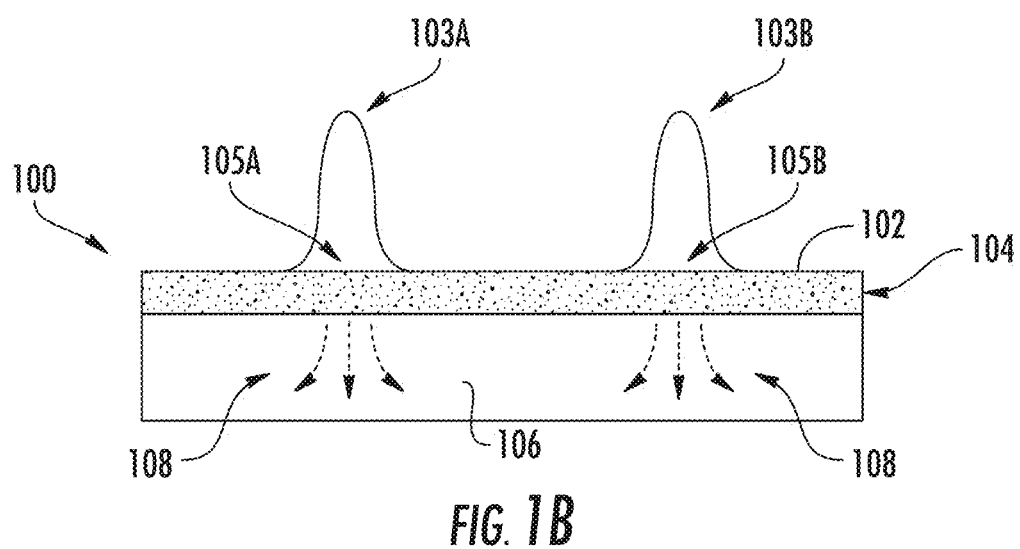
FIG. 1B schematically depicts an example localized heating process to form ion concentration trenches within the ion-exchanged layer of FIG. 1A according to one or more embodiments described and illustrated herein.

Referring now to FIG. 1B, individual narrow waveguides are formed within the ion-exchanged layer 104 of the ion-exchanged layer 104 by locally heating one or more bands (e.g., first band 105A and second band 105B) at the surface 102. The bands may take on any configuration, such as straight, curved, and the like. The local heating causes the ions of the uniform ion-exchanged layer 104 to be locally diffused deeper into the bulk 106 of the ion-exchanged glass substrate 100, as shown by arrows 108. The depletion of ions within the one or more bands creates one or more ion concentration trenches within the one or more bands, wherein a concentration of ions within the one or more bands is lower than a concentration of ions outside of the one or more bands. As the refractive index is mostly linear with respect to ion concentration, after heating for an appropriate amount of time, index trenches within the bands are formed. The local heating should be narrow such that there is minimal or no impact on ions in the regions outside of the heated bands.

The temperature of the local heating should be such that the ions diffuse deeper into the ion-exchanged glass substrate 100, thereby reducing the concentration of ions within the one or more bands. The local heating to cause ion diffusion may depend on the composition of the glass and the replacement ions. As an example and not a limitation, the local heating may have a temperature within a range of 300° C. up to the softening point of the glass substrate. Higher temperature may be preferred, for example at strain point, annealing point or even close to softening point of the glass. As a non-limiting example, the strain point, annealing point and softening point temperatures of Corning Gorilla® Glass 3 made by Corning Inc. of Corning, N.Y. are 574° C., 628° C., and 900° C., respectively.

Figure 2B:
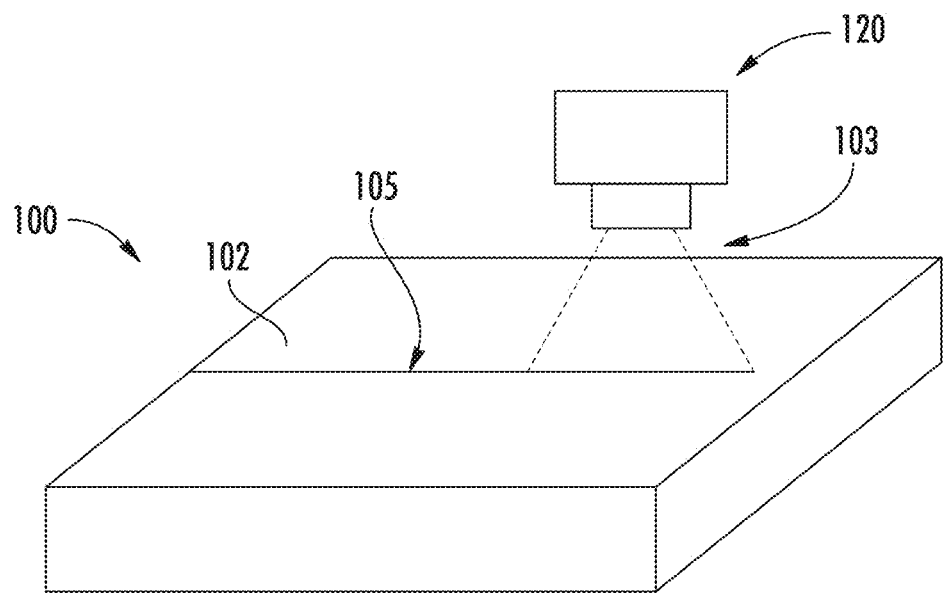
FIG. 2B schematically depicts an example localized heating process including a laser beam on a surface of an ion-exchanged glass substrate according to one or more embodiment described and illustrated herein.

As shown in FIGS. 1B and 2B, the local heating may be provided by application of a laser beam 103 at the surface 102 of the ion-exchanged glass substrate 100. FIG. 1B schematically illustrates application of a first laser beam 103A and a second laser beam 103B at a first band 105A and a second band 105B, respectively. It should be understood that the first laser beam 103A and the second laser beam 103B may be generated concurrently by distinct laser sources, or sequentially by the same laser source. It should also be understood that any number of bands (i.e., ion concentration trenches) may be formed in the ion-exchanged glass substrate 100.

Any laser beam capable of locally heating the bands to a temperature capable of causing ion diffusion may be utilized. Example laser sources include, but are not limited to, $CO_2$ lasers, CO lasers, Nd:YAG lasers, Nd: Glass lasers, Yb:YAG lasers, Yb: glass lasers, Ti: sapphire lasers, and semiconductor lasers. Example laser beam properties include, but are not limited to, wavelengths in the range 0.2 µm to 20 µm, and continuous wave (CW) lasers or pulsed lasers. The power of the laser beam may be in the range of a few tens of watts to few hundreds of watts, for example. For pulsed lasers, the pulse width may be nanoseconds, picoseconds or femtoseconds, and the repetition rate may be from kilohertz to hundreds of megahertz, for example. As shown in FIG. 1B, the laser beams 103A 103B may be Gaussian laser beams, which are simple to generate using conventional optical components. It should be understood that other beams may also be used, such as Bessel beams, Ince-Gaussian beams, and Airy beams. It is further noted that the heating power should be narrowly focused so that the accelerated ion diffusion after heating primarily occurs in the direction of the glass thickness. Fast diffusion of the ions is preferred. The ion diffusion time may be in minutes or in seconds. In the non-limiting, simulated example shown in FIGS. 5A-5F, the local heating temperature is about 800° C., and the ion diffusion time to form a waveguide is about 10 to 30 seconds. The laser beam modeled in FIGS. 5A-5F has about 40 µm penetration depth.

In embodiments, the laser beam penetrates the ion-exchange glass substrate 100 at least the DOL to facilitate ion diffusion into the bulk 106. The depth of laser beam penetration may be established by positioning a beam waist (i.e., focal point) of the laser beam at or below the DOL. As an example, a laser beam with a penetration depth deeper than the DOL (e.g., four times greater than the DOL) facilitates faster diffusion of local ions deeper into the ion-exchanged glass substrate.

Other methods of localized heating may be utilized. As one non-limiting example, resistive heating elements, such as thin-gauge wire, may be applied to the surface 102 of the ion-exchanged glass substrate 100. Application of electrical current through the resistive heating elements causes the resistive heating elements to emit heat, which is transferred to the ion-exchanged glass substrate 100, thereby causing ion diffusion. As another non-limiting example, the localized heating may be provided by application of microwaves.

Figure 1C:
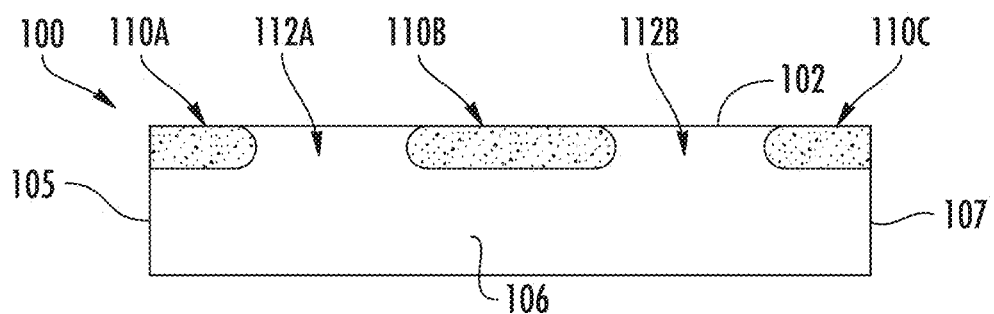
FIG. 1C schematically depicts ion-exchanged waveguides defined by ion concentration trenches according to one or more embodiments described and illustrated herein.

FIG. 1C schematically depicts the ion-exchanged glass substrate 100 after the local heating and ion diffusion. The regions of the ion-exchanged layer 104 that were not heated define waveguides because such regions retained their relatively high index of refraction as compared to the ion concentrations subjected to the localized heating. In the example depicted in FIG. 1C, a first waveguide 110A is disposed between a first edge 105 of the ion-exchanged substrate 100 and a first ion concentration trench 112A. A second waveguide 110B is disposed between the first ion concentration trench 112A and a second ion concentration trench 112B. A third waveguide 110C is disposed between the second ion concentration trench 112B and a second edge 107 of the ion-exchanged glass substrate 100. As the waveguides 110A-110C have a higher index of refraction because of the presence of ions, light is maintained within the waveguides 110A-110C. Thus, the waveguides 110A-110C of the ion-exchanged glass substrate 100 may be utilized in an optical communications system, wherein the waveguides 110A-110C are optically coupled to optical components, such as, without limitation, optical fibers, laser source (e.g., silicon-based lasers), photodiodes, and the like.

As stated hereinabove, the embodiments described herein do not require the use of masks to fabricate the ion-exchanged waveguides. This may reduce the overall cost of fabricating ion-exchanged waveguides, as well as provide the ability to fabricate more precise waveguides.

Figure 3A:
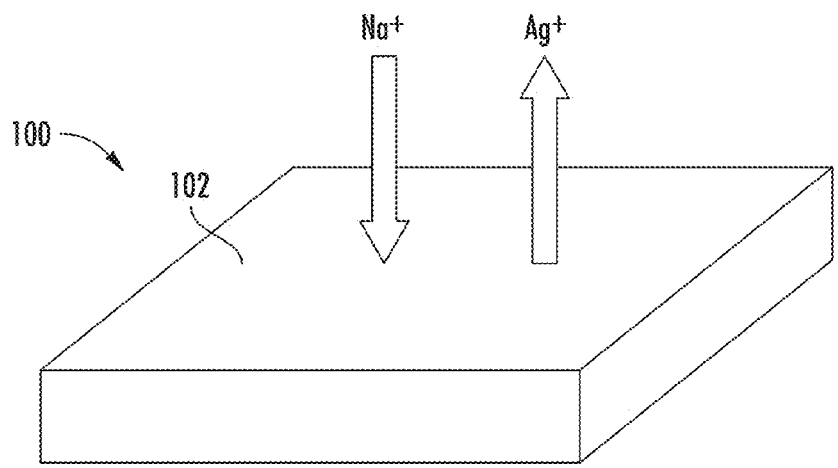
FIG. 3A schematically depicts an example second-step ion-exchange process where sodium ion replace silver ions proximate a surface of a chemically exchanged glass substrate according to one or more embodiments described and illustrated herein.
Figure 3B:
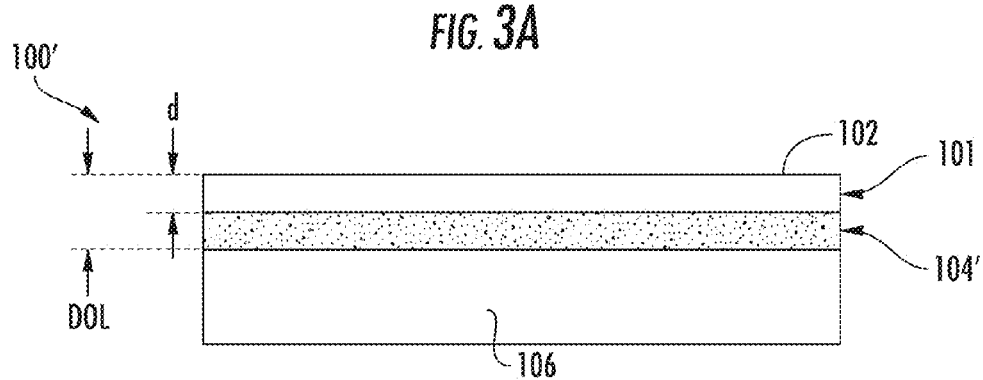
FIG. 3B schematically depicts an example ion-exchange process following a second-step ion-exchange process and comprising a reduced refractive index layer and an ion-exchanged layer according to one or more embodiments described and illustrated herein.
Figure 3C:
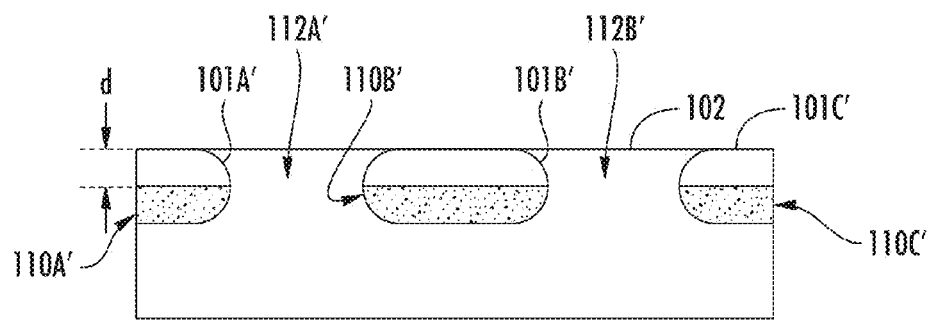
FIG. 3C schematically depicts an example glass substrate having embedded ion-exchanged waveguides.

The waveguides 110A-110C depicted in FIG. 1C extend from the surface 102 to the DOL of the ion-exchanged glass substrate 100. In some applications, it may be desirable to utilize waveguides that are embedded within the ion-exchanged glass substrate 100 and therefore do not contact the surface. FIGS. 3A-3C schematically illustrate an example method of fabricating embedded waveguides below a surface 102 of an ion-exchanged glass substrate 100.

Referring to FIG. 3A, after subjecting the ion-exchanged glass substrate 100 to an ion-exchange solution as depicted in FIG. 2A, a reverse ion-exchange process is performed on the ion-exchanged glass substrate 100. Rather than replacing first ions with second ions within the glass substrate as in the first ion-exchange process depicted in FIG. 2A, the second-step ion-exchange processes replaces the second ions with first ions near the surface 102 of the ion-exchanged glass substrate 100. As shown in the non-limiting example of FIG. 3A, silver ions may be replaced with sodium ions. As a non-limiting example, the second-step ion-exchange solution may comprise $NaNO_3$. Because silver ions are replaced with sodium ions, the second-step ion-exchange process reduces the index of refraction near the surface 102 of the ion-exchanged glass substrate 100.

Referring to FIG. 3B, the time and temperature of the second-step ion-exchange process should be such that a reduced refractive index layer 101 is formed extending from the surface 102 of the ion-exchanged glass substrate 100' to a desired depth d, and a thinned ion-exchange layer 104' remains below the reduced refractive index layer 101. As non-limiting examples, the desired depth d may be about 3 µm, 5 µm or even more than 10 µm. As further non-limiting examples, the desired depth d may be ⅒, ¼ or ½ of the depth of ion-exchange layer 104 from the first-step ion exchange process. As non-limiting examples, the duration of the second-step ion exchange process may be less than 5 minutes, less than 1 minute, less than 30 seconds, or less than 10 seconds. The temperature may be in a range from 300° C. up to the softening point of the glass substrate. As a non-limiting example, Corning Gorilla® Glass 3 softening point temperature is about 900° C.

Embedded waveguides may be formed within the ion-exchanged glass substrate 100' by the localized heating process described above and schematically depicted in the example process of FIG. 1B. For example, a laser beam may create ion concentration trenches in narrow bands at the surface of the ion-exchange glass substrate.

FIG. 3C schematically depicts embedded waveguides 110A'-110C' formed within the ion-exchanged glass substrate 100' at a depth d. Thus, an upper surface of the embedded waveguides 110A'-110C' is not at the surface 102 but rather at a desired depth d. Portions 101A'-101C' of the reduced refractive index layer 101 remain after the localized heating and formation of first and second ion concentration trenches 112A', 112B'. The portions 101A-101C' of the reduced refractive index layer 101 are located between the surface 102 and the embedded waveguides 110A'-110C'.

Other methods may also be used to create embedded waveguides 110A'-110C'. Rather than perform the two-step ion-exchange processes described above and depicted in FIG. 3B, in some embodiments a single-step ion-exchange process is performed as shown in FIG. 2A. Localized heating is applied to create the ion concentration trenches and waveguides (e.g., the ion concentration trenches 112A, 112B and waveguides 110A-110C as shown in FIG. 1C). To create embedded waveguides, such as the embedded waveguides 110A'-110C' depicted in FIG. 3C, localized heating is then applied to the surface 102 of the ion-exchanged glass substrate 100 at the waveguides 110A-110C to causes ions proximate the surface 102 to diffuse deeper into the ion-exchanged glass substrate 100. This localized heating creates reduced refractive index portions 101A-101C located between the surface 102 and embedded waveguides 110A'-110C'.

The temperature and time of the localized heating should be enough to cause ion diffusion but not enough to eliminate the waveguides or significantly reduce the ion concentration within the desired area for the waveguides. The localized heating at the waveguides 110A-110C may be provided by a laser beam, for example. Non-limiting laser beam properties to create the embedded waveguides include wavelengths in the range of 0.2 µm to 20 µm, CW or pulsed lasers, and power in the range of a few tens of watts to a few hundreds of watts, for example. For pulsed lasers, the pulse width may be nanoseconds, picoseconds or femtoseconds, and the repetition rate can be from kilohertz to hundreds of megahertz, for example.

Figure 4:
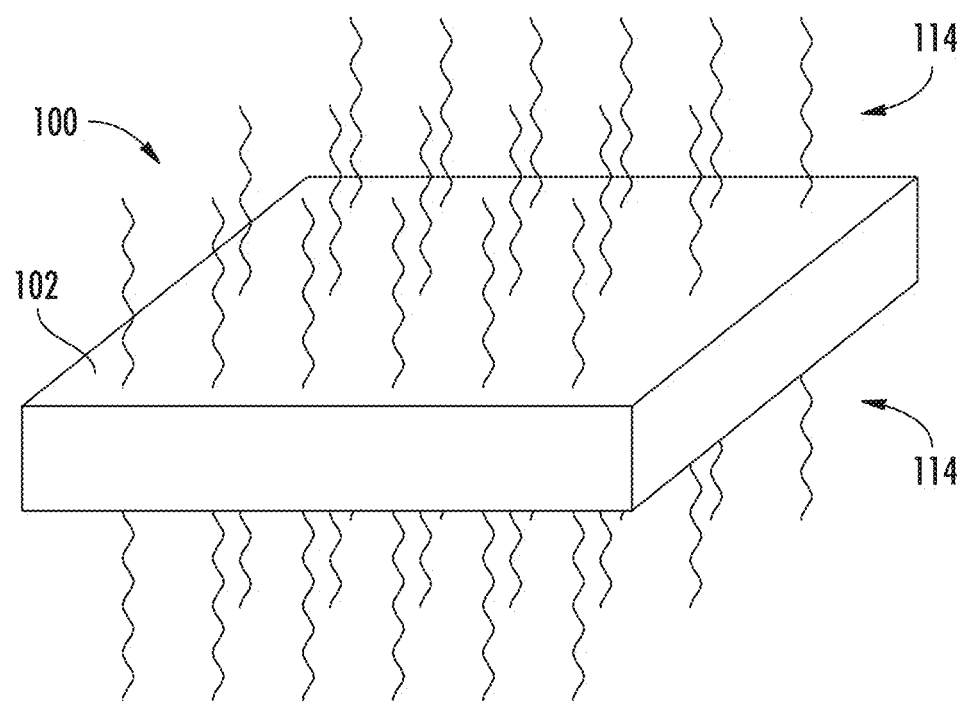
FIG. 4 schematically depicts an example uniform heating process according to one or more embodiments described and illustrated herein.

Referring now to FIG. 4, the ion concentration profile of the ion-exchanged glass substrate 100 may be modified to a desired profile by uniformly heating the ion-exchanged glass substrate 100 by application of thermal energy 114. For example, the ion concentration may be highest near the surface 102 of the ion-exchanged glass substrate following the ion-exchange process. To provide for a uniform ion concentration in the ion-exchanged layer 104 and the resulting waveguides, a uniform heating may be applied to the ion-exchanged glass substrate 100. The uniform heating process may provide for a symmetrical optical power distribution within the waveguide for a better match to a coupled optical component, such as a round end of an optical fiber.

The uniform heating may be applied before the localized heating to form the waveguides or after formation of the waveguides. The uniform heating may also be applied after formation of embedded waveguides as described above. The uniform heating may be performed to achieve a desired profile of index of refraction for the waveguides. The time and temperature may depend on the glass composition as well as the desired profile of index of refraction. For silver ion exchange with sodium ions present in the glass substrate, non-limiting uniform heating parameters include from a few hours at relatively lower temperature (e.g., about 5 hours at about 300° C.) to a few minutes at higher temperature (e.g., about 2 minutes at about 500° C. to about 600° C.).

According to embodiments described herein, ion concentration profiles within ion-exchanged glass substrates are manipulated to form optical waveguides. FIGS. 5A-5F graphically illustrate ion concentrations within a thickness of a glass substrate at various stages of embedded waveguide formation in accordance with the two-step ion-exchange process described above. In images of FIGS. 5A-5F, the vertical axis is glass thickness while the horizontal axis is glass width. The scale is normalized ion concentration where the ion concentration at the surface of the glass is 1. It is noted that the ion concentration scale is changed to 0.4 in FIGS. 5B-5F to better show ion concentration changes.

Figure 5A:
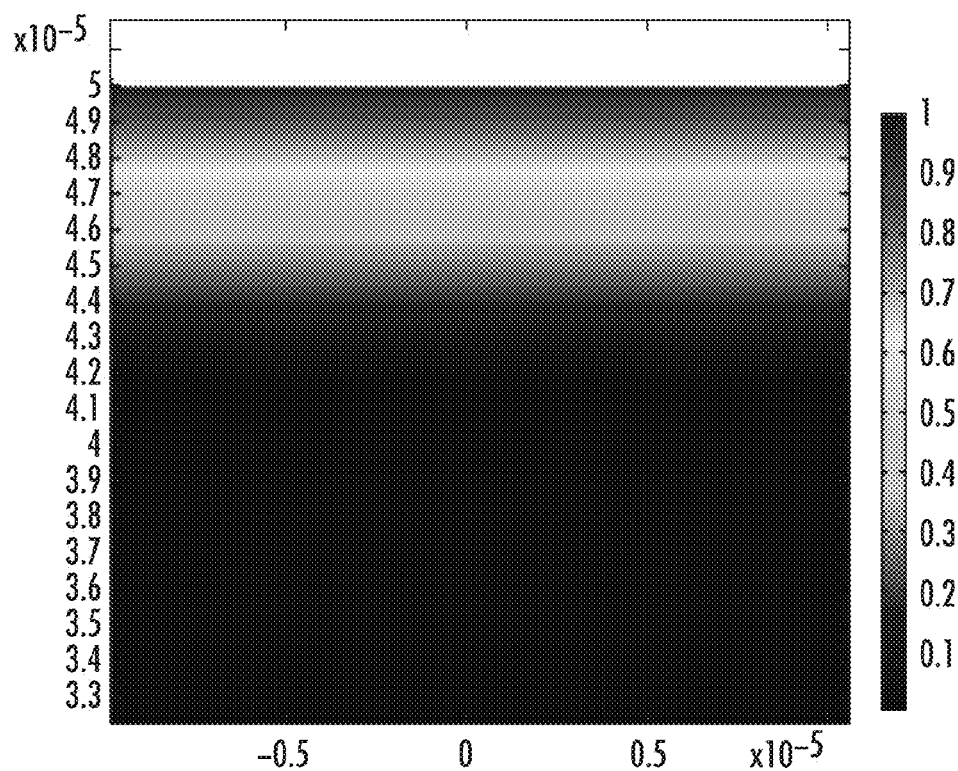
FIGS. 5A-5F graphically depicts ion concentration profiles within a glass substrate during an ion-exchange waveguide fabrication process according to one or more embodiments described and illustrated herein.

The glass substrate simulated in FIGS. 5A-5F is Corning Gorilla® Glass 3. However, it should be understood that embodiments of the present disclosure apply to any sodium-containing glasses, such as sodium-containing borosilicate, phosphate, aluminosilicate, and alkali-aluminosilicate glasses. FIG. 5A depicts the ion concentration profile after a simulated first-step ion-exchange process including an $AgNO_3$ bath to exchange sodium ions for silver ions (see FIG. 1A). The highest silver ion concentration is located near the surface of the glass.

Figure 5B:
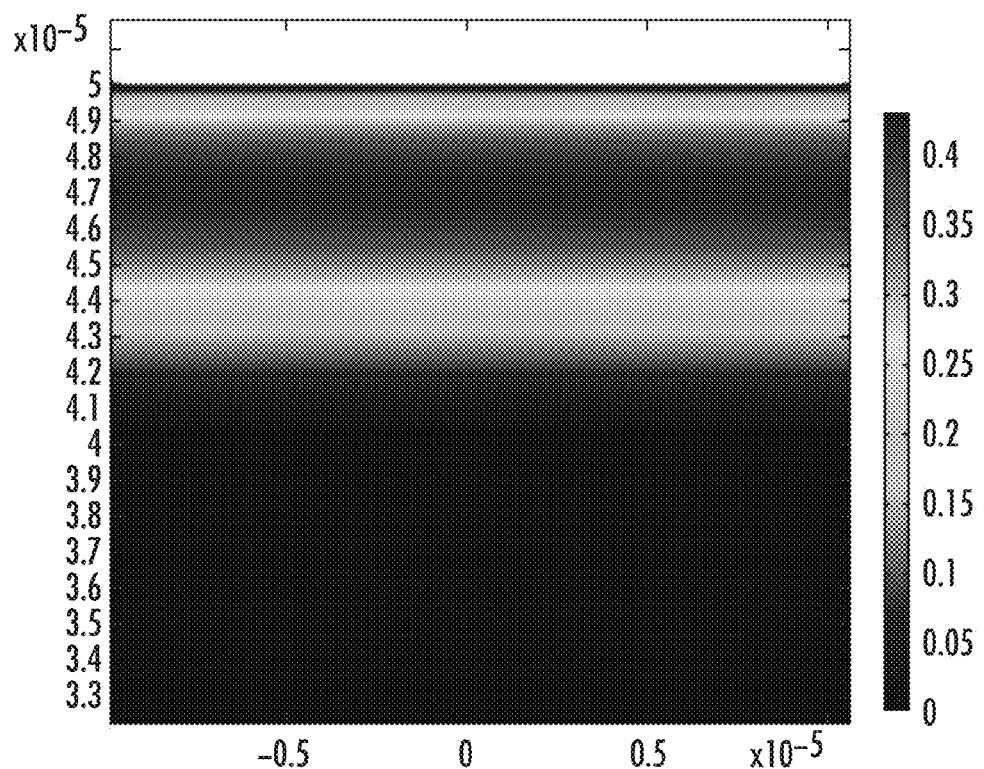
Figure 5C:
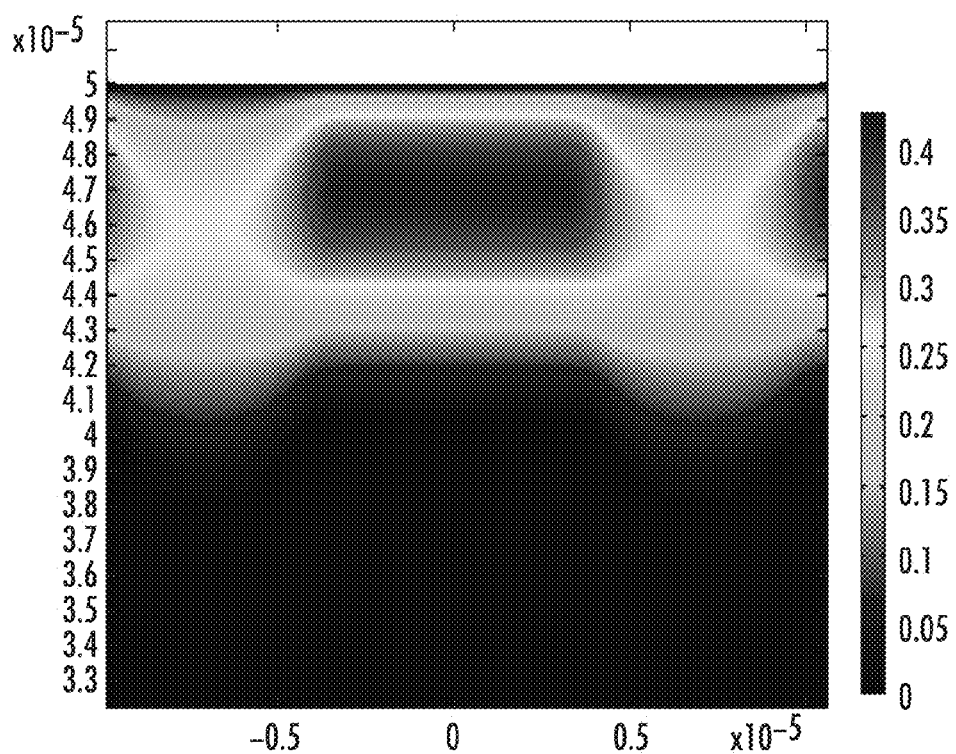
Figure 5D:
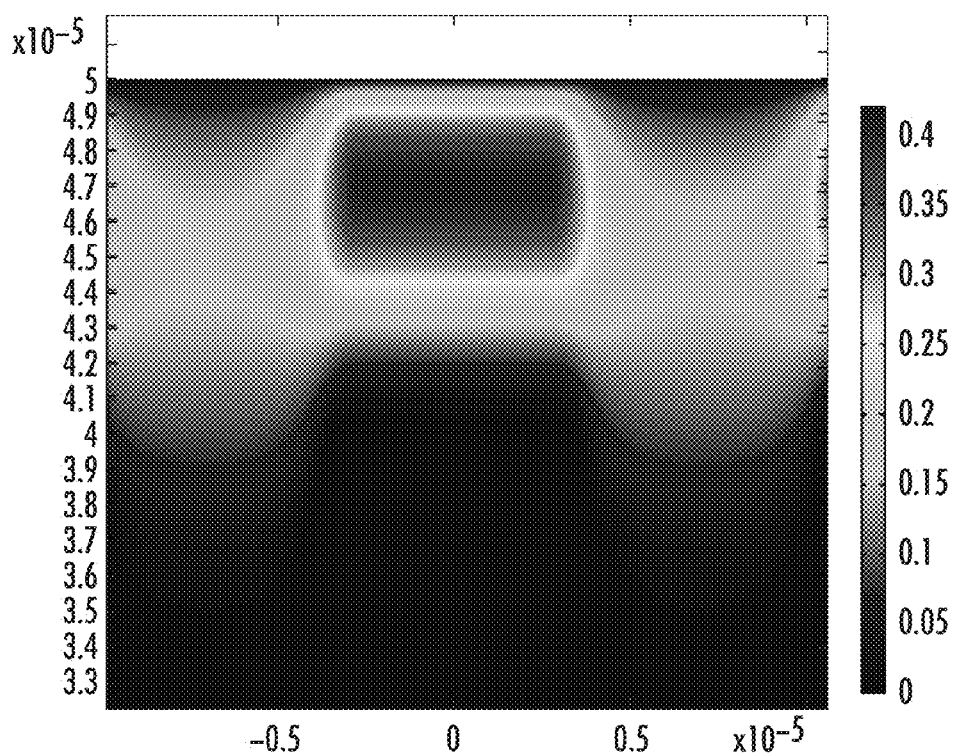
Figure 5E:
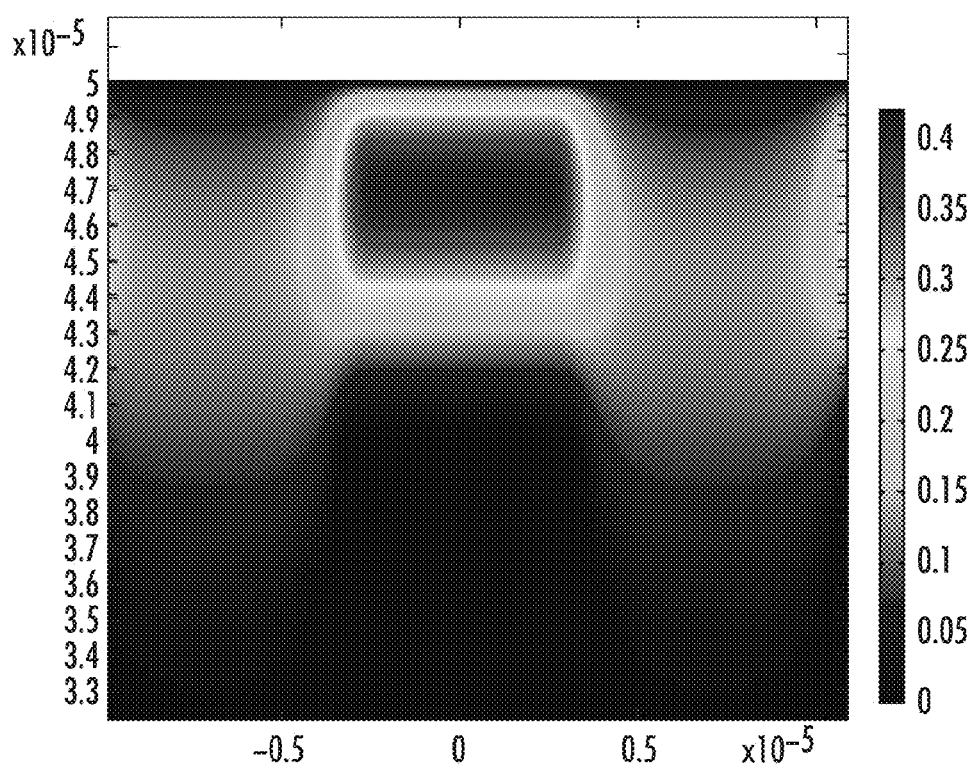
Figure 5F:
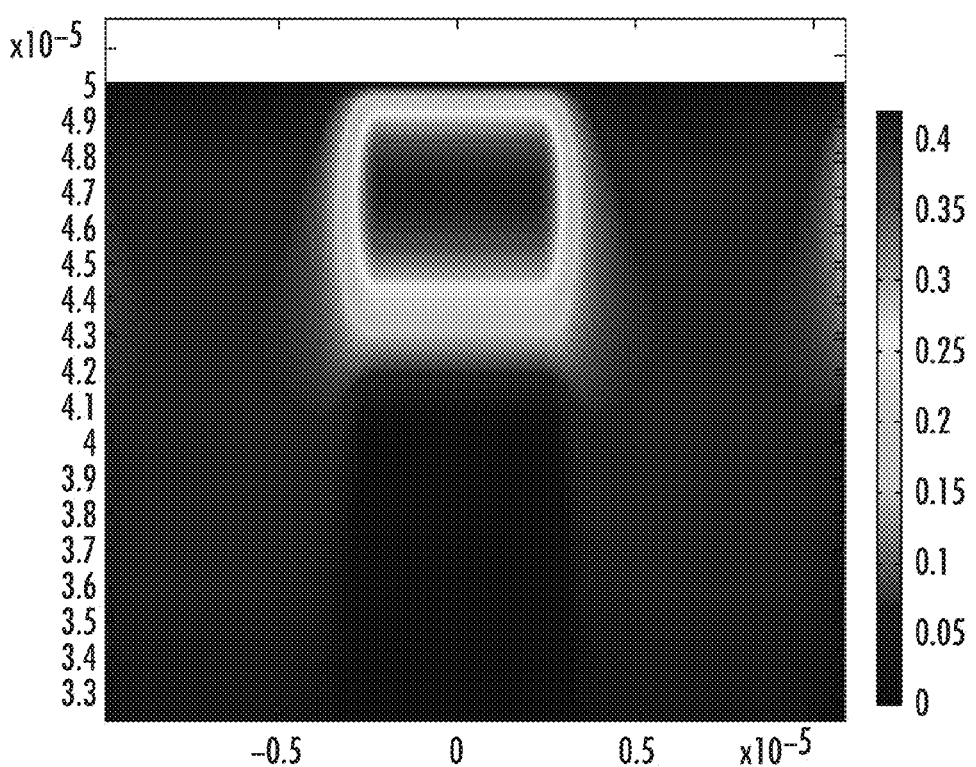
Figure 6A:
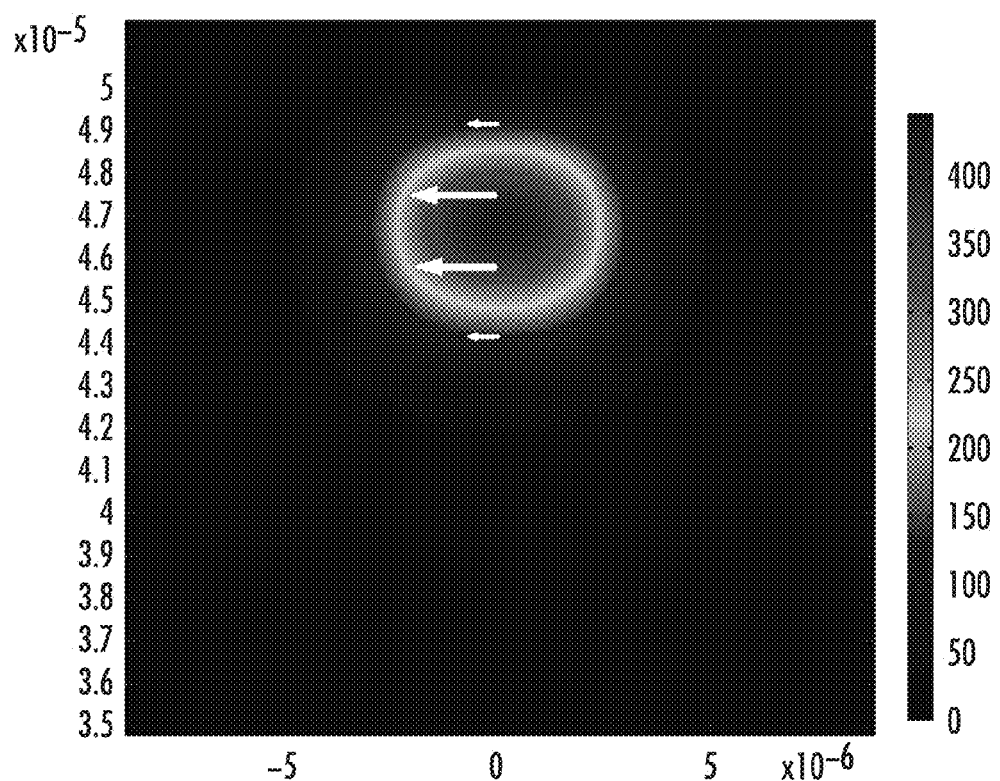
FIGS. 6A-6F graphically depict guided modes within the ion-exchanged waveguide of FIG. 5F according to one or more embodiments described and illustrated herein.
Figure 6B:
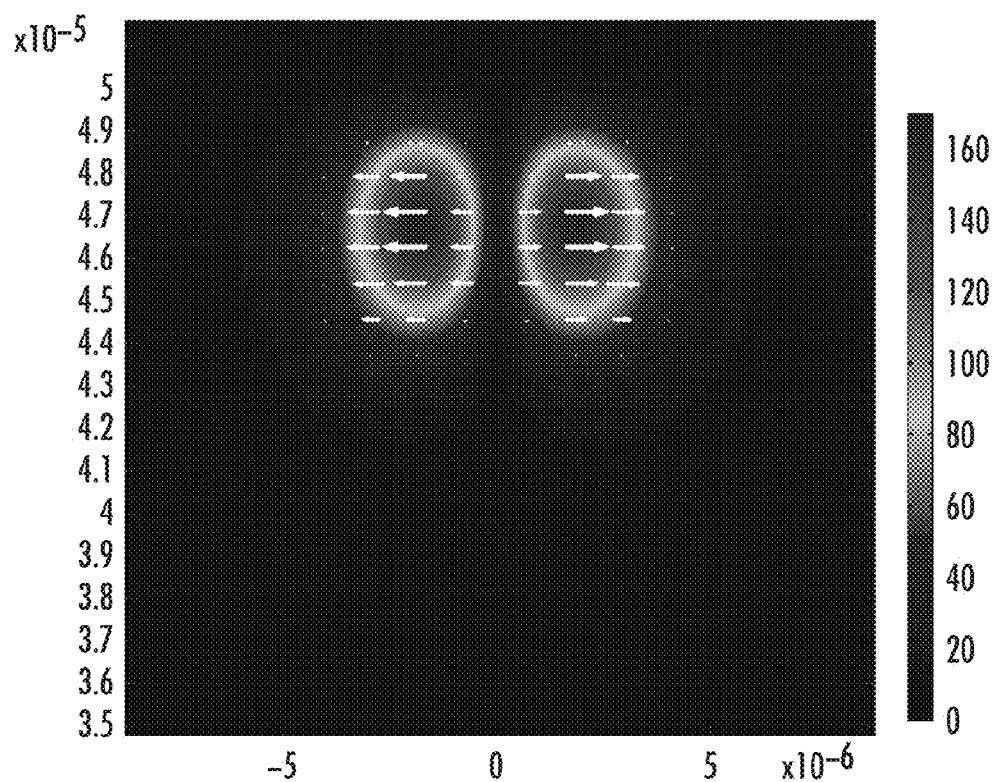
Figure 6C:
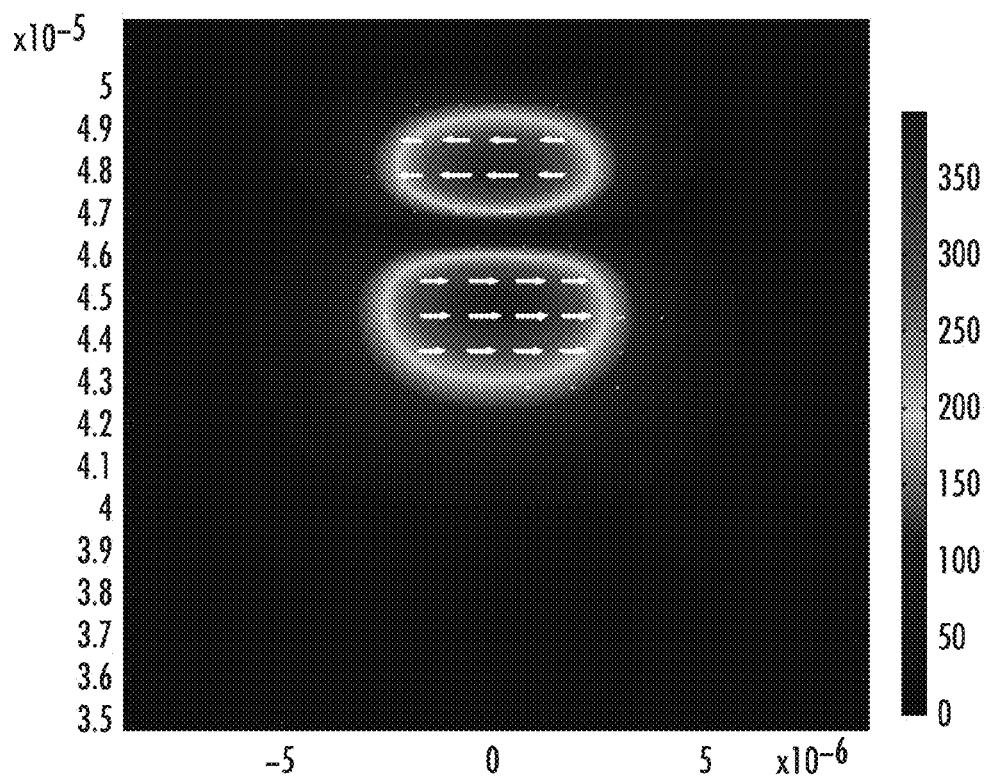
Figure 6D:
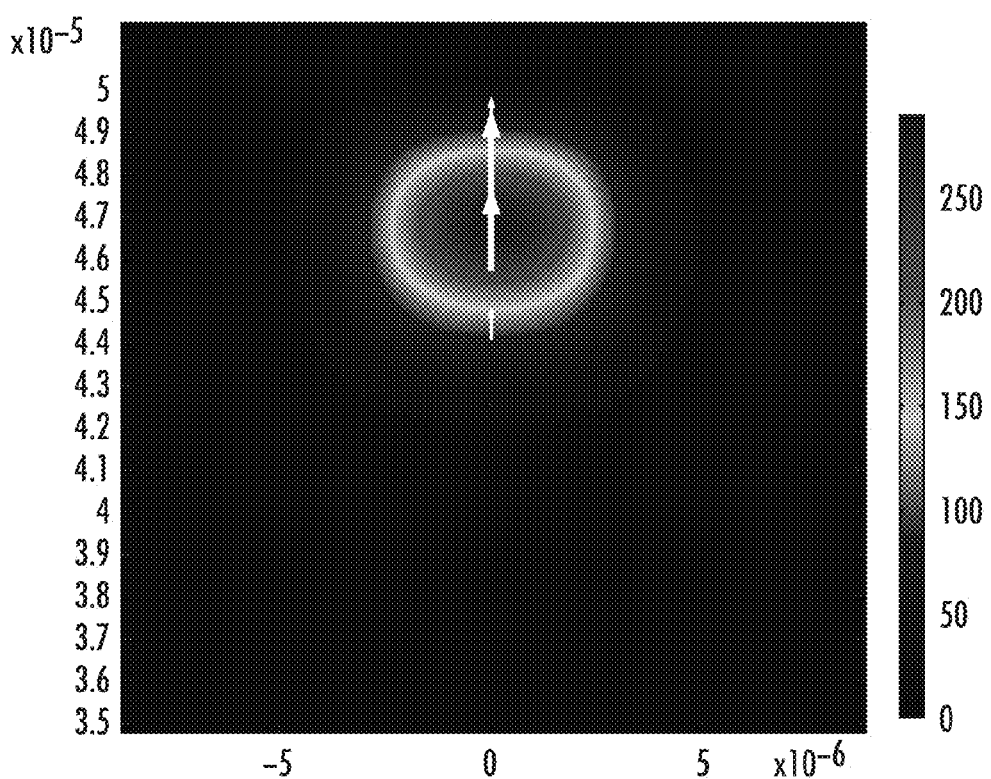
Figure 6E:
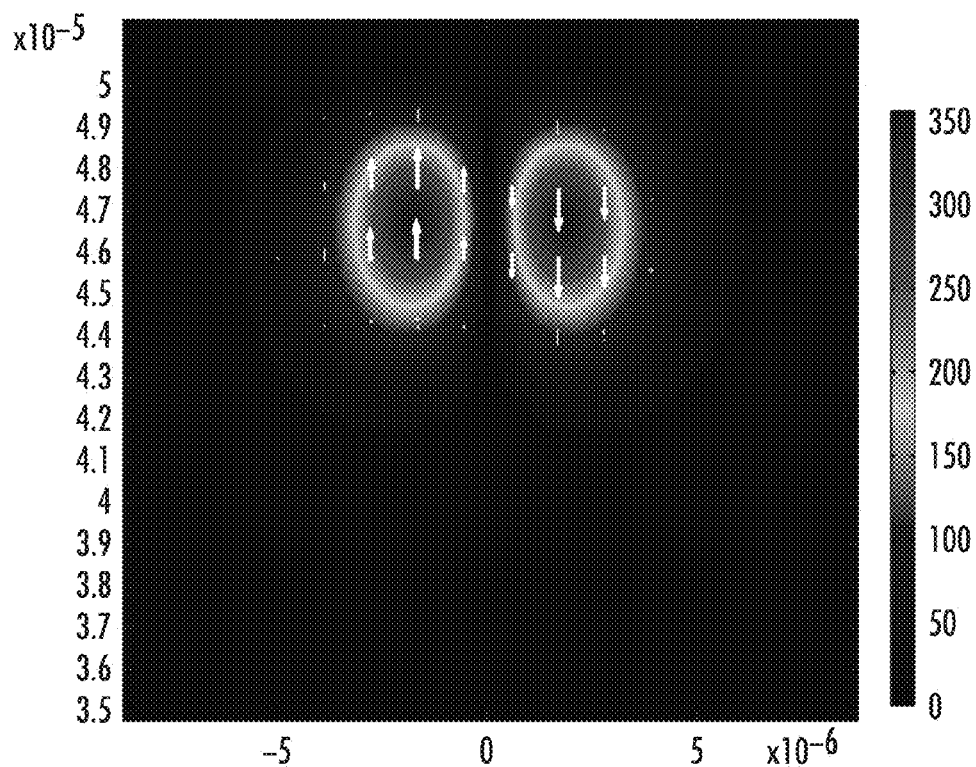
Figure 6F:
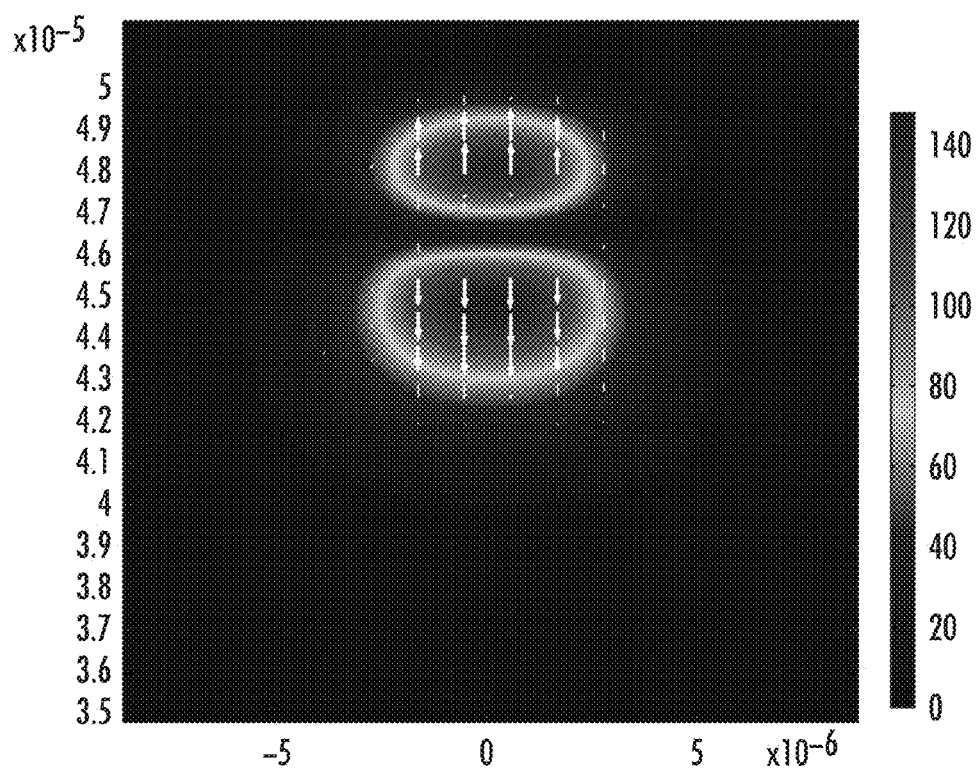

FIG. 5B depicts a silver ion concentration profile after a simulated second-step ion-exchange process to create a reduced refractive index layer at the surface of the ion-exchanged glass substrate (see FIG. 3B). A $NaNO_3$ bath was simulated in the second-step ion-exchange process to exchange silver ions or sodium ions proximate the surface of the ion-exchanged glass substrate. FIGS. 5C-5F show ion concentration profile evolution with time in response to two localized heating sources, for example achievable in form of two Gaussian profile laser beams with penetration depth about four times the initial ion-exchanged layer depth of layer. The localized Gaussian-profiled heating pattern used in the mathematical model of the simulation has a depth of penetration of about 30 μm to about 40 μm in the glass, and a width about 10 μm in the glass substrate. FIG. 5F depicts a completed ion-exchanged waveguide.

The ion concentration profile achieved in FIG. 5F was used to estimate the refractive index profile for propagation mode calculations for optical signals propagating within the waveguide. FIGS. 6A-6F depict guided modes in the waveguide of FIG. 5F. For the illustrated case, two groups of guided modes are supported including LP01 and LP11 modes. It is noted that the waveguide core size may be made smaller by an ion-exchange process with shorter time and lower temperature. The width of the waveguide core may be made smaller or larger by adjusting the distance between the adjacent trenches.

It should now be understood that embodiments described herein are directed to methods of forming ion-exchanged waveguides using a localized heating process that does not require the use of masks. The ion-exchanged waveguides may be at the surface of a glass substrate or embedded within the glass substrate. Ion concentration profiles of the glass substrate may be manipulated to local and uniform heating processes to create waveguides having a desired index of refraction. Glass substrates having ion-exchanged waveguides as described herein may be incorporated into optical communication applications, such as optical coupling devices operable to optically couple components such as, without limitation, optical fibers and active optical components (e.g., laser source and photodetector devices).

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. A method of forming a waveguide in a glass substrate comprising an ion-exchanged layer, the method comprising:
    providing a glass substrate comprising an ion-exchanged layer, wherein the ion-exchanged layer comprises ions, and the ion-exchanged layer extends from a surface of the glass substrate to a depth within the glass substrate; and
    locally heating at least one band at the surface of the glass substrate to diffuse ions in the ion-exchanged layer, wherein the ion diffusion decreases the concentration of ions within the at least one band to form at least one waveguide in a region within the ion-exchanged layer having a higher concentration of ions than the concentration of ions that exists in the at least one band after the localized heating.

2. The method of claim 1, wherein an index of refraction of the ion-exchanged glass substrate is higher within the waveguide than within the at least one band after the localized heating.

3. The method of claim 1, wherein:
    the at least one band comprises a first band and a second band; and
    the at least one waveguide is disposed between the first band and the second band.

4. The method of claim 1, wherein the waveguide extends from the surface of the ion-exchanged glass substrate.

5. The method of claim 1, wherein an upper surface of the waveguide is disposed at a depth d from the surface of the ion-exchanged glass substrate.

6. The method of claim 1, where an ion concentration at the surface of the ion-exchanged glass substrate is less than an ion concentration at a depth d within the ion-exchanged glass substrate.

7. The method of claim 1, further comprising locally heating the surface of the ion-exchanged glass substrate at the at least one waveguide such that ion diffusion occurs at the surface of the ion-exchanged glass substrate, an ion concentration at the surface of the ion-exchanged glass substrate is less than an ion concentration at a depth d within the ion-exchanged glass substrate, and an upper surface of the waveguide is disposed at a depth d from a surface of the ion-exchanged glass substrate.

8. The method of claim 1, wherein locally heating the at least one band comprises translating a laser beam with respect to the surface of the ion-exchanged glass substrate along the at least one band.

9. The method of claim 8, wherein the laser beam is a Gaussian laser beam.

10. The method of claim 8, wherein the laser penetrates the glass substrate at least to the depth of the ion-exchanged layer.

11. The method of claim 8, wherein the laser penetrates the glass substrate at a depth that is at least four times the depth of the ion-exchanged layer.

12. A method of forming a waveguide in a glass substrate, the method comprising:
  exposing the glass substrate to an ion-exchange solution to form an ion-exchanged layer extending from a surface of the glass substrate to a depth within the glass substrate; and
  locally heating at least one band at the surface of the glass substrate to diffuse ions in the ion-exchanged layer, wherein the ion diffusion decreases the concentration of ions within the at least one band, such that:
    the localized heating results in a concentration of ions within the at least one band that is less than the concentration of ions in the at least one band prior to the localized heating; and
    the at least one waveguide is defined as at least one region within the ion-exchanged layer having a higher concentration of ions than the concentration of ions that exists in the at least one band after the localized heating.

13. The method of claim 12, wherein an index of refraction of the glass substrate is higher within the waveguide than within the at least one band.

14. The method of claim 12, wherein:
  the at least one band comprises a first band and a second band; and
  the at least one waveguide is disposed between the first band and the second band.

15. The method of claim 12, wherein the waveguide extends from the surface of the glass substrate.

16. The method of claim 12, further comprising, after exposing the glass substrate to the ion-exchange solution and prior to locally heating the at least one band:
  exposing the glass substrate to a second ion-exchange solution such that an index of refraction at the surface of the glass substrate is less than an index of refraction at a depth d within the glass substrate.

17. The method of claim 16, wherein the ion-exchange solution comprises $AgNO_3$ and the second ion-exchange solution comprises $NaNO_3$.

18. The method of claim 12, wherein an upper surface of the waveguide is disposed at a depth d from a surface of the glass substrate.

19. The method of claim 12, further comprising locally heating the surface of the glass substrate at the at least one waveguide such that ion diffusion occurs at the surface of the glass substrate, an ion concentration at the surface of the glass substrate is less than an ion concentration at a depth d within the glass substrate, and an upper surface of the waveguide is disposed at a depth d from a surface of the glass substrate.

20. The method of claim 12, further comprising, after exposing the glass substrate to the ion-exchange solution and prior to locally heating the at least one band:
  applying heat to an entire area of the glass substrate.

21. The method of claim 12, wherein locally heating the at least one band comprises translating a laser beam with respect to the surface of the glass substrate along the at least one band.

22. The method of claim 21, wherein the laser beam is a Gaussian laser beam.

23. The method of claim 21, wherein the laser penetrates the glass substrate at least to the depth of the ion-exchanged layer.

24. The method of claim 23, wherein the laser penetrates the glass substrate at a depth that is at least four times the depth of the ion-exchanged layer.

25. A method of forming a waveguide in a glass substrate, comprising:
  providing a glass substrate;
  creating an ion-exchanged layer in the glass substrate; and
  locally heating the glass substrate to cause ions of the ion-exchanged layer to diffuse out of one or more regions of the ion-exchanged layer, wherein:
  the diffusion of ions out of the one or more regions of the ion-exchanged layer (i) decreases the concentration of ions in the one or more regions to produce one or more low refractive index trenches and (ii) produces one or more ion-exchanged waveguides between the boundaries of the one or more low refractive index trenches;
  the concentration of ions in the one or more low refractive index trenches is lower than the concentration of ions in the one or more ion-exchanged waveguides; and
  the index of refraction of the one or more low refractive index trenches is lower than the index of refraction of the one or more ion-exchanged waveguides.

\* \* \* \* \*